United States Patent
Koga (10) Patent No.: US 11,046,530 B2
(45) Date of Patent: Jun. 29, 2021

(54) ARTICLE TRANSFER APPARATUS, ROBOT SYSTEM, AND ARTICLE TRANSFER METHOD

(71) Applicant: Fanuc Corporation, Yamanashi (JP)

(72) Inventor: Kentaro Koga, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 6 days.

(21) Appl. No.: 16/204,762

(22) Filed: Nov. 29, 2018

(65) Prior Publication Data
US 2019/0193947 A1   Jun. 27, 2019

(30) Foreign Application Priority Data

Dec. 26, 2017   (JP) .............................. JP2017-249594

(51) Int. Cl.
*B25J 9/16*   (2006.01)
*B65G 47/00*   (2006.01)
(Continued)

(52) U.S. Cl.
CPC ............ *B65G 47/00* (2013.01); *B25J 9/1697* (2013.01); *B65G 43/00* (2013.01);
(Continued)

(58) Field of Classification Search
CPC .... B65G 47/00; B65G 47/902; B65G 47/905; B65G 43/00; G05B 19/4182;
(Continued)

(56) References Cited

U.S. PATENT DOCUMENTS

| 4,876,728 A | 10/1989 | Roth |
| 6,610,953 B1 * | 8/2003 | Tao .......................... B07C 5/342 |
| | | 209/11 |

(Continued)

FOREIGN PATENT DOCUMENTS

| AT | 507339 B1 | 6/2011 |
| CN | 102837317 A | 12/2012 |

(Continued)

OTHER PUBLICATIONS

Matsuura, Yo; Notice of Reasons for Refusal for Japanese Patent Application No. 2017-249594; dated Dec. 24, 2019; 3 pages.
(Continued)

*Primary Examiner* — Masud Ahmed
(74) *Attorney, Agent, or Firm* — Shackelford, Bowen, McKinley & Norton, LLP (57) ABSTRACT

An article transfer apparatus includes: a conveyor configured to transfer workpieces; a photographing unit that acquires a three-dimensional image by photographing the transferred workpieces; a workpiece distinguishing unit that detects three-dimensional shapes and postures of the workpieces on the basis of the three-dimensional image acquired by the photographing unit; a storage unit that stores therein three-dimensional shapes of reference workpieces and postures of the reference workpieces in a state in which the reference workpieces do not overlap with another workpiece; and an overlap judgement unit that judges whether there is an overlap between the workpieces on the basis of the three-dimensional shapes and the postures of the reference workpieces stored in the storage unit, and the three-dimensional shapes and the postures of the workpieces detected by the workpiece distinguishing unit.

13 Claims, 10 Drawing Sheets

(51) Int. Cl.
*G05B 19/418* (2006.01)
*G06T 7/73* (2017.01)
*G06T 7/50* (2017.01)
*B65G 43/00* (2006.01)

(52) U.S. Cl.
CPC ............ *G05B 19/4182* (2013.01); *G06T 7/50* (2017.01); *G06T 7/74* (2017.01); *G06T 7/75* (2017.01); *G05B 2219/39102* (2013.01); *G06T 2200/04* (2013.01); *G06T 2207/10012* (2013.01); *G06T 2207/10016* (2013.01); *G06T 2207/10028* (2013.01); *G06T 2207/30164* (2013.01)

(58) Field of Classification Search
CPC ........... G05B 2219/39102; G05B 2219/40554; G06T 7/75; G06T 7/74; G06T 7/50; G06T 2200/04; G06T 2207/10016; G06T 2207/10028; G06T 2207/10012; G06T 2207/30164; B25J 9/0093; B25J 19/04; B25J 9/1697
See application file for complete search history.

(56) References Cited

U.S. PATENT DOCUMENTS

| | | | |
|---|---|---|---|
| 9,227,323 B1* | 1/2016 | Konolige | B25J 9/1612 |
| 9,393,686 B1 | 7/2016 | Bradski et al. | |
| 2012/0290130 A1* | 11/2012 | Kapoor | G05B 19/41885 700/247 |
| 2012/0323358 A1 | 12/2012 | Izumi et al. | |
| 2013/0125319 A1* | 5/2013 | Regan | A43D 11/00 12/142 R |
| 2013/0151007 A1* | 6/2013 | Valpola | B25J 9/1694 700/245 |
| 2014/0018959 A1 | 1/2014 | Matsui | |
| 2014/0316573 A1* | 10/2014 | Iwatake | B25J 9/1697 700/258 |
| 2014/0365010 A1 | 12/2014 | Yasuda et al. | |
| 2015/0022638 A1 | 1/2015 | Saeki | |
| 2016/0112694 A1 | 4/2016 | Nishi et al. | |
| 2017/0017862 A1* | 1/2017 | Konishi | G06K 9/6202 |
| 2017/0066597 A1* | 3/2017 | Hiroi | B65G 15/00 |
| 2017/0109876 A1 | 4/2017 | Kitamura | |
| 2017/0154430 A1 | 6/2017 | Yoshii | |
| 2017/0217620 A1 | 8/2017 | Zeilstra | |
| 2017/0236262 A1 | 8/2017 | Oh Nuki et al. | |
| 2017/0349385 A1 | 12/2017 | Moroni et al. | |
| 2017/0355205 A1* | 12/2017 | Tobita | G06T 7/292 |
| 2018/0194573 A1* | 7/2018 | Iwai | B25J 9/0093 |
| 2018/0215555 A1 | 8/2018 | Ooba | |

FOREIGN PATENT DOCUMENTS

| | | |
|---|---|---|
| CN | 106062820 A | 10/2016 |
| EP | 2538373 A2 | 12/2012 |
| EP | 2810747 A2 | 12/2014 |
| EP | 3118813 A1 | 1/2017 |
| JP | H08-323669 A | 12/1996 |
| JP | 2001-188604 A | 7/2001 |
| JP | 2002-113679 A | 4/2002 |
| JP | 2010-120141 A | 6/2010 |
| JP | 2010-207989 A | 9/2010 |
| JP | 2010-247959 A | 11/2010 |
| JP | 2012-055995 A | 3/2012 |
| JP | 2014-210310 A | 11/2014 |
| JP | 2014-237188 A | 12/2014 |
| JP | 2015-157343 A | 9/2015 |
| JP | 2016-078184 A | 5/2016 |
| JP | 2017-094407 A | 6/2017 |
| JP | 2017-100216 A | 6/2017 |
| JP | 2017-124450 A | 7/2017 |
| JP | 2017-533822 A | 11/2017 |
| JP | 2018-122370 A | 8/2018 |
| WO | WO-2012/140770 A1 | 10/2012 |
| WO | WO-2016/067163 A1 | 5/2016 |

OTHER PUBLICATIONS

Industrial Property Cooperation Center; Search Report by Registered Search Organization; Japanese Patent Application No. 2017-249594; dated Nov. 22, 2019; 15 pages.
The State Intellectual Property Office of the People's Republic of China; First Office Action for Chinese Application No. 201811577439.5; dated Jun. 1, 2020; 6 pages.
Liebschner, Mario; Office Action for German Patent Application No. 102018132213.5; dated Dec. 17, 2020; 6 pages.

* cited by examiner

ARTICLE TRANSFER APPARATUS, ROBOT SYSTEM, AND ARTICLE TRANSFER METHOD

CROSS-REFERENCE TO RELATED APPLICATIONS

This application is based on Japanese Patent Application No. 2017-249594, the content of which is incorporated herein by reference.

TECHNICAL FIELD

The present invention relates to an article transfer apparatus, a robot system, and an article transfer method.

BACKGROUND ART

Hitherto, there has been known an article transfer apparatus that photographs a plurality of workpieces, which are randomly placed on a conveyor and move by the operation of the conveyor, by a photographing apparatus, and performs a workpiece picking task by a robot with use of an image photographed by the photographing apparatus (for example, see PTL 1 and PTL 2). An article transfer apparatus disclosed in PTL 1 calculates an average value, on a horizontal plane, of the center of gravity of a plurality of workpieces placed on a conveyor so as not to overlap with each other, and distinguishes a workpiece of which center of gravity is the farthest from the calculated average value of the center of gravity as a task target. An article transfer apparatus disclosed in PTL 2 extracts a workpiece that does not overlap with other workpieces as a candidate for a task target with use of a two-dimensional image of the workpieces acquired by a camera.

CITATION LIST

Patent Literature

{PTL 1}
Japanese Unexamined Patent Application, Publication No. 2012-55995
{PTL 2}
Japanese Unexamined Patent Application, Publication No. 2014-237188

SUMMARY OF INVENTION

An aspect of the present invention is directed to an article transfer apparatus including: a conveyor configured to transfer a workpiece; a photographing unit that acquires a three-dimensional image by photographing the workpiece transferred by the conveyor; a workpiece distinguishing unit that detects a three-dimensional shape and a posture of the workpiece on the basis of the three-dimensional image acquired by the photographing unit; a storage unit that stores therein a three-dimensional shape of a reference workpiece and a posture of the reference workpiece in a state in which the reference workpiece does not overlap with another workpiece; and an overlap judgement unit that judges whether there is an overlap with the workpiece on the basis of the three-dimensional shape and the posture of the reference workpiece stored in the storage unit, and the three-dimensional shape and the posture of the workpiece detected by the workpiece distinguishing unit.

Another aspect of the present invention is directed to a robot system including: the aforementioned article transfer apparatus; and a robot configured to perform a task on the workpiece that is judged by the overlap judgement unit to not have an overlap with another of the workpieces, and configured to not perform a task on the workpiece that is judged by the overlap judgement unit to have an overlap with another of the workpieces.

In addition, another aspect of the present invention is directed to an article transfer method, including: a photographing step of acquiring a three-dimensional image by photographing a workpiece transferred by a conveyor; a workpiece distinguishing step of detecting a three-dimensional shape and a posture of the workpiece on the basis of the acquired three-dimensional image; and an overlap judgement step of judging whether there is an overlap between the workpiece and another workpiece on the basis of the three-dimensional shape and the posture of the workpiece detected in the workpiece distinguishing step, and a three-dimensional shape and a posture of a reference workpieces that is stored.

DESCRIPTION OF EMBODIMENTS

A robot system 100 including an article transfer apparatus 10 according to an embodiment of the present invention is described below with reference to the drawings.

Figure 1:
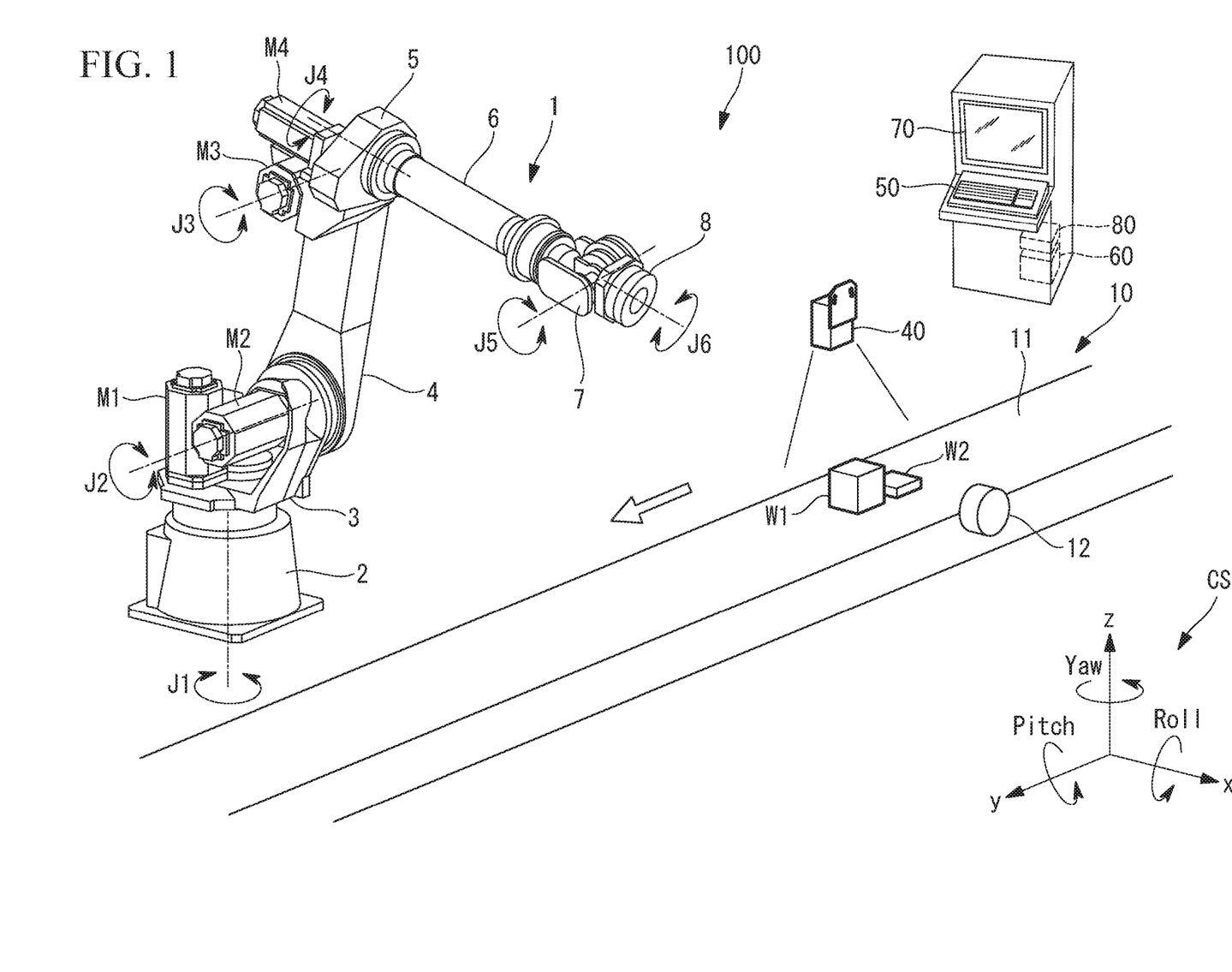
FIG. 1 is a schematic perspective view of a robot system including an article transfer apparatus according to an embodiment of the present invention.

As illustrated in FIG. 1, the robot system 100 according to this embodiment includes the article transfer apparatus 10 that transfers a plurality of workpieces, and a robot 1 that performs various tasks on the workpieces transferred by the article transfer apparatus 10.

The robot 1 is a vertical articulated type robot including six axes J1 to J6, for example. As illustrated in FIG. 1, the robot 1 includes a base 2 fixed to a floor surface, a turning body 3 supported so as to be rotatable with respect to the base 2 about a first perpendicular axis J1, a first arm 4 supported so as to be rotatable with respect to the turning body 3 about a second horizontal axis J2, a second arm 5 supported so as to be rotatable with respect to the first arm 4 about a third horizontal axis J3, a first wrist element 6 supported so as to be rotatable with respect to the second arm 5 about a fourth axis J4 in a skewed positional relationship with the third axis J3, a second wrist element 7 supported so as to be rotatable with respect to the first wrist element 6 about a fifth axis J5 orthogonal to the fourth axis J4, and a third wrist element 8 supported so as to be rotatable with respect to the second wrist element 7 about a sixth axis J6 orthogonal to the fifth axis J5.

The six axes J1 to J6 include motors M1, M2, M3, and M4 (motors are not shown for J5 and J6) respectively that are driven to rotate, and encoders (not shown) that detect the rotation angles of the motors. By a control signal transmitted from the control unit 60, a feedback control that drives the motors to rotate is performed with use of the rotation angles of the motors detected by the encoders of the axes J1 to J6.

As illustrated in FIG. 1, the article transfer apparatus 10 includes a conveyor 11 that transfers a plurality of workpieces W1 and W2, an encoder (a conveyor information acquisition unit) 12 that detects the transfer speed of the conveyor 11, a three-dimensional camera (a photographing unit) 40 that acquires a three-dimensional image of a predetermined range on the conveyor 11, an operation unit (an input unit) 50 that receives an input from a user, a monitor (an image display unit) 70 that displays an image in accordance with the received input and various controls, a control unit 60 that controls the input received by the operation unit 50 and the entire robot system 100, and a storage unit (a storage unit) 80 that stores therein data relating to the workpieces transferred by the article transfer apparatus 10.

The conveyor 11 moves workpieces at a predetermined speed in the direction of the arrow indicated in FIG. 1 by the rotation of a motor (not shown). Information on the transfer speed of the conveyor 11 acquired by the encoder 12 is transmitted to the control unit 60. The control unit 60 performs a feedback control on the transfer speed of the conveyor 11 with use of the transfer speed acquired by the encoder 12.

The three-dimensional camera 40 photographs a predetermined range on the conveyor 11, and hence acquires a three-dimensional image of the workpieces W1 and W2 transferred by the conveyor 11. Image data of the three-dimensional image acquired by the three-dimensional camera 40 is transmitted to the control unit 60.

The control unit 60 includes a CPU, a ROM, a RAM, and a memory (which are not shown). The control unit 60 can execute functions corresponding to various programs by reading programs stored in the storage unit 80 and temporarily reading out from and storing the programs into the RAM.

Figure 2:
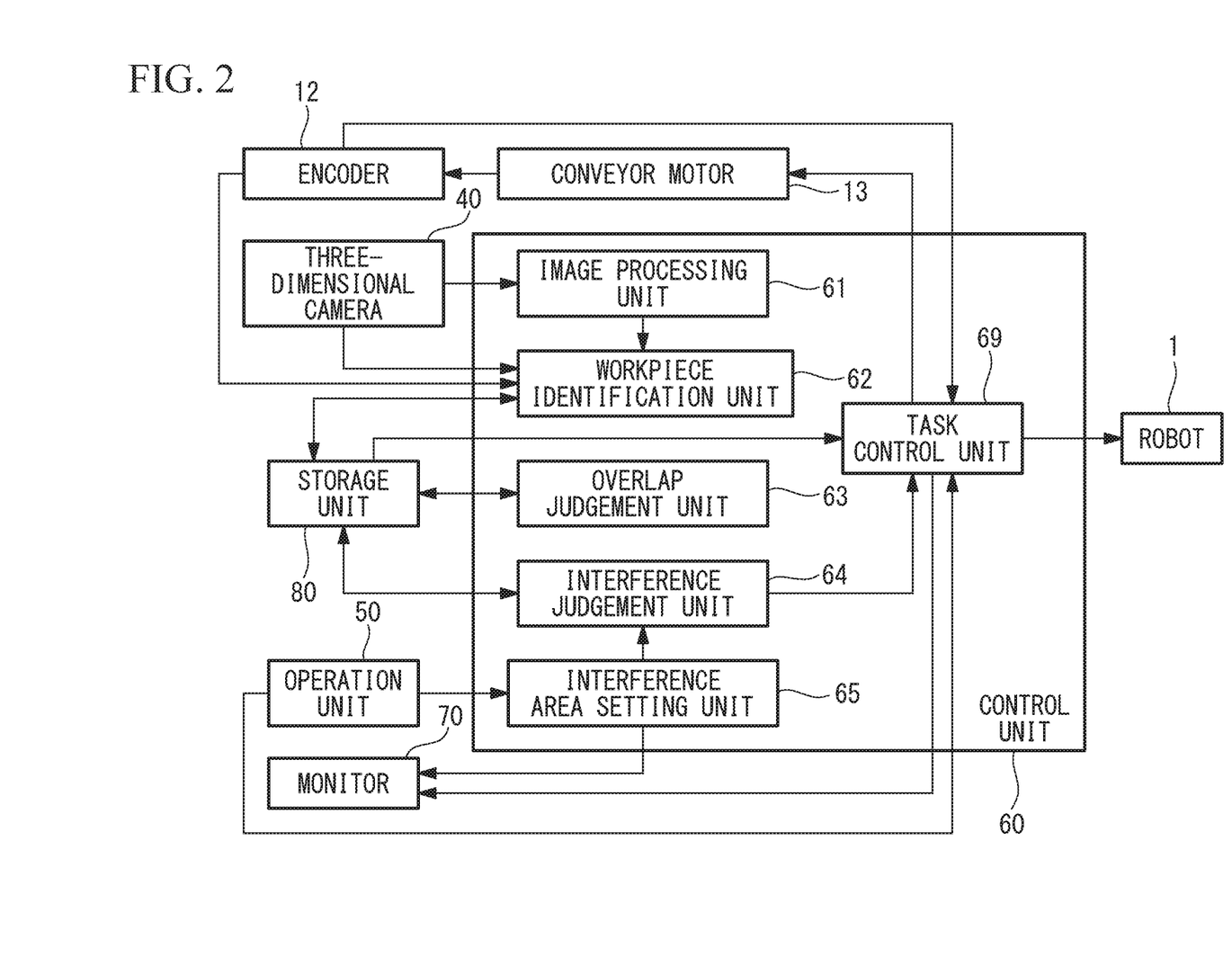
FIG. 2 is a block diagram of a control unit and peripheral devices of the control unit.

FIG. 2 illustrates a block diagram of units relating to the control unit 60 and the control of the control unit 60. As illustrated in FIG. 2, the control unit 60 includes an image processing unit 61 that performs various processing on the three-dimensional image acquired by the three-dimensional camera 40, a workpiece identification unit (a workpiece distinguishing unit, a reference workpiece setting unit) 62 that detects a workpiece transferred by the conveyor 11, an overlap judgement unit (an overlap judgement unit) 63 that judges whether the detected workpiece overlaps with other workpieces, an interference area setting unit (an interference area setting unit) 65 that sets a predetermined range around the detected workpiece as an interference area, an interference judgement unit (an interference judgement unit) 64 that judges whether other workpieces are interfering with the interference area set for the workpiece, and a task control unit 69 that controls a task performed by the robot 1.

The image processing unit 61 performs well-known image processing, for example, binarization processing on the image data received from the three-dimensional camera 40, to thereby emphasize the outlines and the like of the workpieces in the image.

The workpiece identification unit 62 identifies the three-dimensional shape and the posture of the workpiece transferred by the conveyor 11 with use of the three-dimensional image on which image processing is performed by the image processing unit 61. The three-dimensional shape and the posture of the workpiece that are identified are stored in the storage unit 80.

The workpiece identification unit 62 compares the three-dimensional shape and the posture of the identified workpiece with the three-dimensional shapes and the reference position postures of a plurality of reference workpieces stored in the storage unit 80 in advance, to thereby judge which reference workpiece is the same workpiece as the identified workpiece or not. The reference workpiece is a workpiece that becomes a candidate for the task target of the robot 1, and CAD (computer-aided design) data of a three-dimensional model and the reference position posture that is one posture serving as a reference are stored in the storage unit 80 in advance in association with each other. The reference position posture of the reference workpiece is a posture of the reference workpiece in a state in which the reference workpiece is transferred by the conveyor 11 without overlapping with other workpieces.

In addition, the workpiece identification unit 62 can set a workpiece that is not stored in the storage unit 80 as a reference workpiece yet as a new reference workpiece, and store the new reference workpiece in the storage unit 80. When the new reference workpiece is set, first, a workpiece to be set as the reference workpiece is transferred by the conveyor 11 in a state in which the workpiece does not overlap with other workpieces, and the three-dimensional camera 40 acquires a three-dimensional image of the workpiece. On the basis of the acquired three-dimensional image, the workpiece identification unit 62 sets the three-dimensional shape and the posture of the identified workpiece as the three-dimensional shape and the reference position posture of the reference workpiece to be newly set.

The overlap judgement unit 63 judges whether a workpiece overlaps with another workpiece (hereinafter also referred to as "to perform overlap judgement") when a plurality of workpieces are transferred by the conveyor 11. In the overlap judgement, after the target workpiece is identified as it is the same workpiece as the reference workpiece by the workpiece identification unit 62, the overlap judgement unit 63 judges the overlap between the workpieces by comparing the posture of the workpiece identified by the workpiece identification unit 62 to the reference position posture of the reference workpiece. Specifically, the overlap judgement unit 63 compares the posture of the identified workpiece with the reference position posture, and judges that there is no overlap between the workpieces when neither of the following two conditions is satisfied. Meanwhile, when either of the following two conditions is satisfied, it is judged that the identified workpiece overlaps with other workpieces.

1 The height direction (a Z direction) of the workpiece is different.
2 There is a rotation about an x-axis or a y-axis parallel to a plane of the conveyor 11 (there is a Roll angle or a Pitch angle).

Note that, in this embodiment, the height direction of the workpiece is determined by the height of the center of gravity of the identified workpiece.

Figure 3:
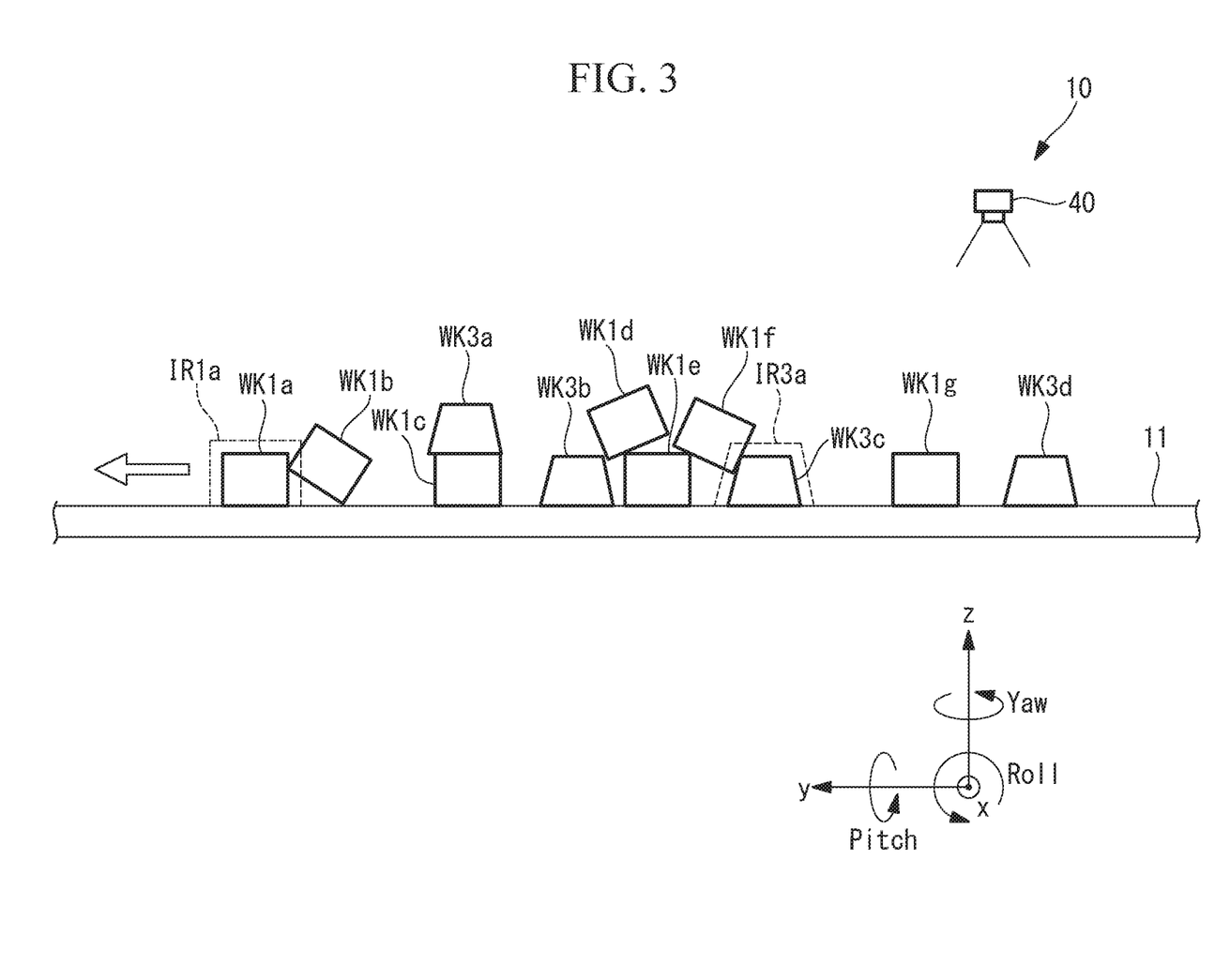
FIG. 3 is a schematic view illustrating a plurality of workpieces transferred by a conveyor.

In FIG. 3, workpieces WK1$a$ to WK1$g$ having the same shapes as the workpiece W1 in FIG. 1 and workpieces WK3$a$ to WK3$d$ having the same shapes that are different from the shape of the workpiece W1 that are transferred by the conveyor 11 are illustrated. In the example illustrated in FIG. 3, in the order from the left, the workpieces WK1$b$, WK3$a$, WK1$d$, and WK1$f$ are judged to be overlapping workpieces with reference to the aforementioned two conditions. Specifically, the workpieces WK1$b$, WK1$d$, and WK1$f$ are tilted with respect to the transferring surface of the conveyor 11, and hence satisfy the two conditions for being different from the reference position posture. The workpiece WK3$a$ is not tilted with respect to the transferring surface of the conveyor 11, but is on the other workpiece WK1$c$. Therefore, the workpiece WK3$a$ is different in the height direction, and satisfies the aforementioned condition 1.

Figure 4:
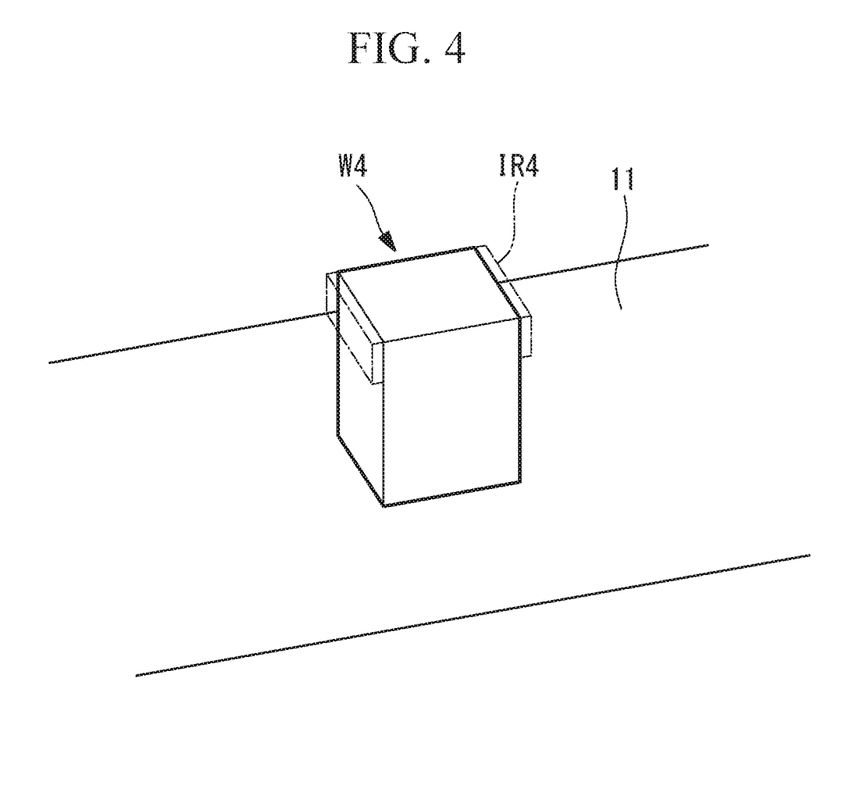
FIG. 4 is a perspective view illustrating a workpiece and an interference area set for the workpiece.

The interference area setting unit 65 sets a predetermined interference area around the external form of the three-dimensional shape of the workpiece identified by the workpiece identification unit 62 in the three-dimensional image. The interference area is set as an area corresponding to a space gripped by a hand and the like of the robot 1 when the workpiece is transferred by the conveyor 11, for example. In this embodiment, interference areas are stored in association with the reference workpieces stored in the storage unit 80. When the workpiece identification unit 62 sets a new reference workpiece, an interference area can be set for the new reference workpiece by receiving the operation of the user by the operation unit 50. When it is identified that a workpiece transferred by the conveyor 11 is the same workpiece as a reference workpiece, the interference area setting unit 65 sets an interference area set for the reference workpiece to the identified workpiece. Examples of the interference area include an interference area IR1$a$ set for the workpiece WK1$a$ and an interference area IR3$a$ set for the workpiece WK3$c$ illustrated in FIG. 3, an interference area IR4 of a workpiece W4 illustrated in FIG. 4, and the like.

The interference area setting unit 65 can display the reference workpiece and the interference area set for the reference workpiece on the monitor 70. In accordance with the operation received by the operation unit 50, the interference area setting unit 65 can change the size of the interference area that is set and the position at which the interference area is set on the workpiece, and display the changed interference area on the monitor 70 in association with the workpiece.

Figure 5:
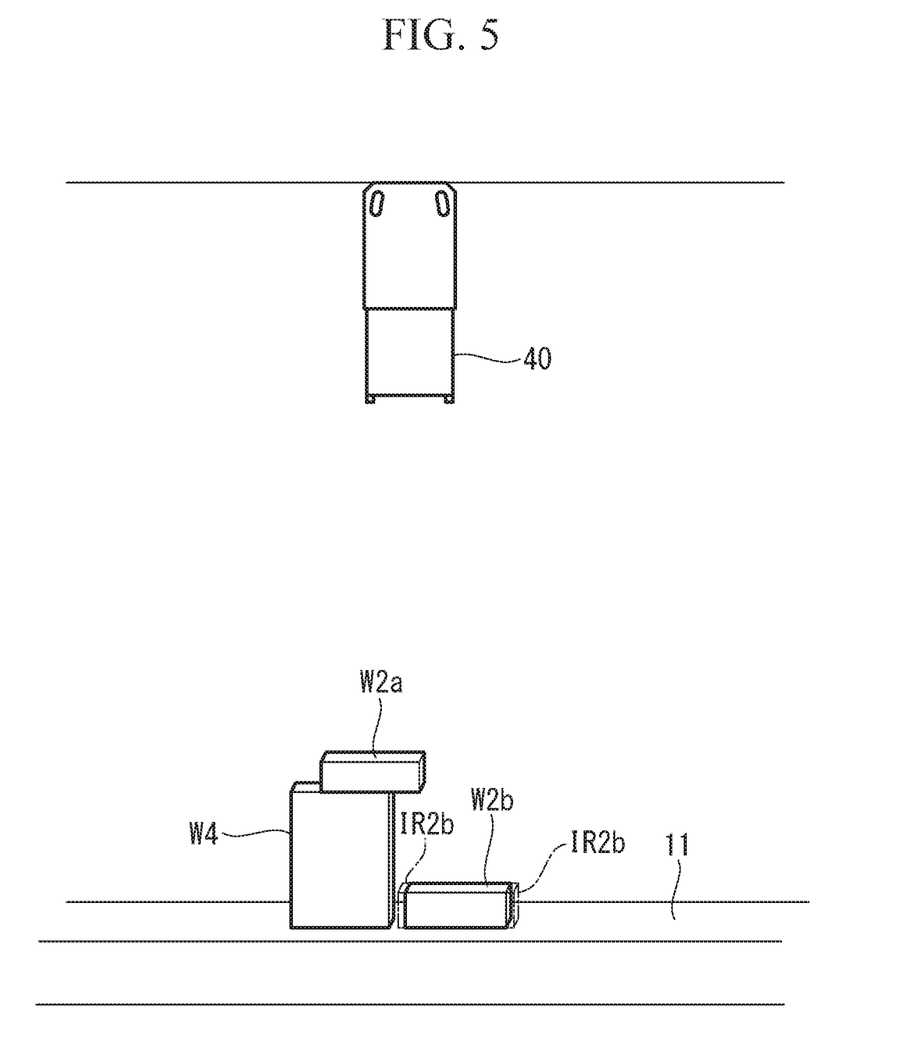
FIG. 5 is a perspective view illustrating a positional relationship between the interference area set for a workpiece and a plurality of workpieces.

The interference judgement unit 64 judges, for the workpieces transferred by the conveyor 11, whether other workpieces are interfering with the interference area set for the identified workpiece (hereinafter also referred to as "to perform interference judgement") with use of the three-dimensional shape and the posture of the workpiece identified by the workpiece identification unit 62, and the interference area set for the reference workpiece by the interference area setting unit 65. When there are other workpieces in the interference area, the interference judgement unit 64 judges that there is interference. In addition, as illustrated in FIG. 5, the interference judgement unit 64 judges that there is interference also when there is a workpiece W2$a$ as the other workpiece on the workpiece W4 above an interference area IR2$b$ set for a workpiece W2$b$ in the height direction.

The task control unit 69 controls the robot 1 in accordance with the operation received by the operation unit 50. Specifically, the task control unit 69 controls the rotation of the motors of the axes J1 to J6 of the robot 1 in order to perform various tasks on the workpieces transferred by the conveyor 11. In addition, the task control unit 69 performs a feedback control on a conveyor motor 13 that determines the transfer speed of the conveyor 11 with use of a detection value of the encoder 12.

Reference workpiece setting processing for setting a workpiece transferred by the conveyor 11 as a new reference workpiece, and task target workpiece determination processing including the overlap judgement performed by the overlap judgement unit 63 and the interference judgement performed by the interference judgement unit 64 are described below with reference to each flowchart.

Figure 6:
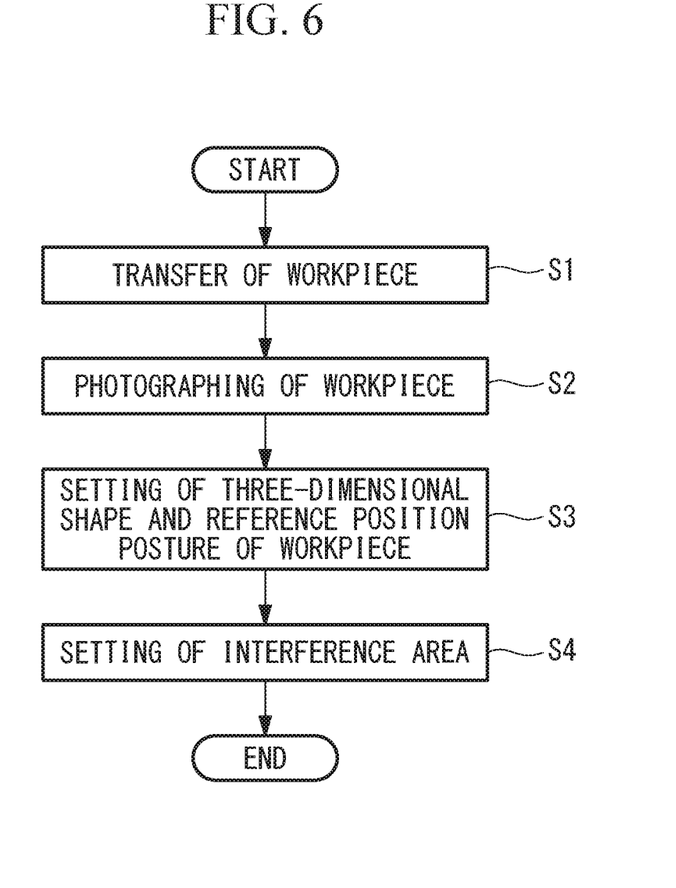
FIG. 6 is a flowchart of reference workpiece setting processing.

In the reference workpiece setting processing illustrated in FIG. 6, first, a workpiece to be newly set as a reference workpiece is transferred by the conveyor 11 (step S1). The workpiece transferred by the conveyor 11 is photographed by the three-dimensional camera 40 (step S2).

The workpiece identification unit 62 identifies the three-dimensional shape and the posture of the workpiece with use of the three-dimensional image of the workpiece acquired by the three-dimensional camera, sets the identified three-dimensional shape as the three-dimensional shape of the reference workpiece, and sets the identified posture as the reference position posture of the reference workpiece (step S3). Next, the interference area setting unit 65 sets an interference area for the newly set reference workpiece (step S4), and the reference workpiece setting processing ends. In this embodiment, the reference workpiece is displayed on the monitor 70, and the interference area is set by the operation received by the operation unit 50. When the interference area is set, the interference area setting unit 65 stores the newly set reference workpiece and the interference area set for the reference workpiece in the storage unit 80 in association with each other.

Figure 7:
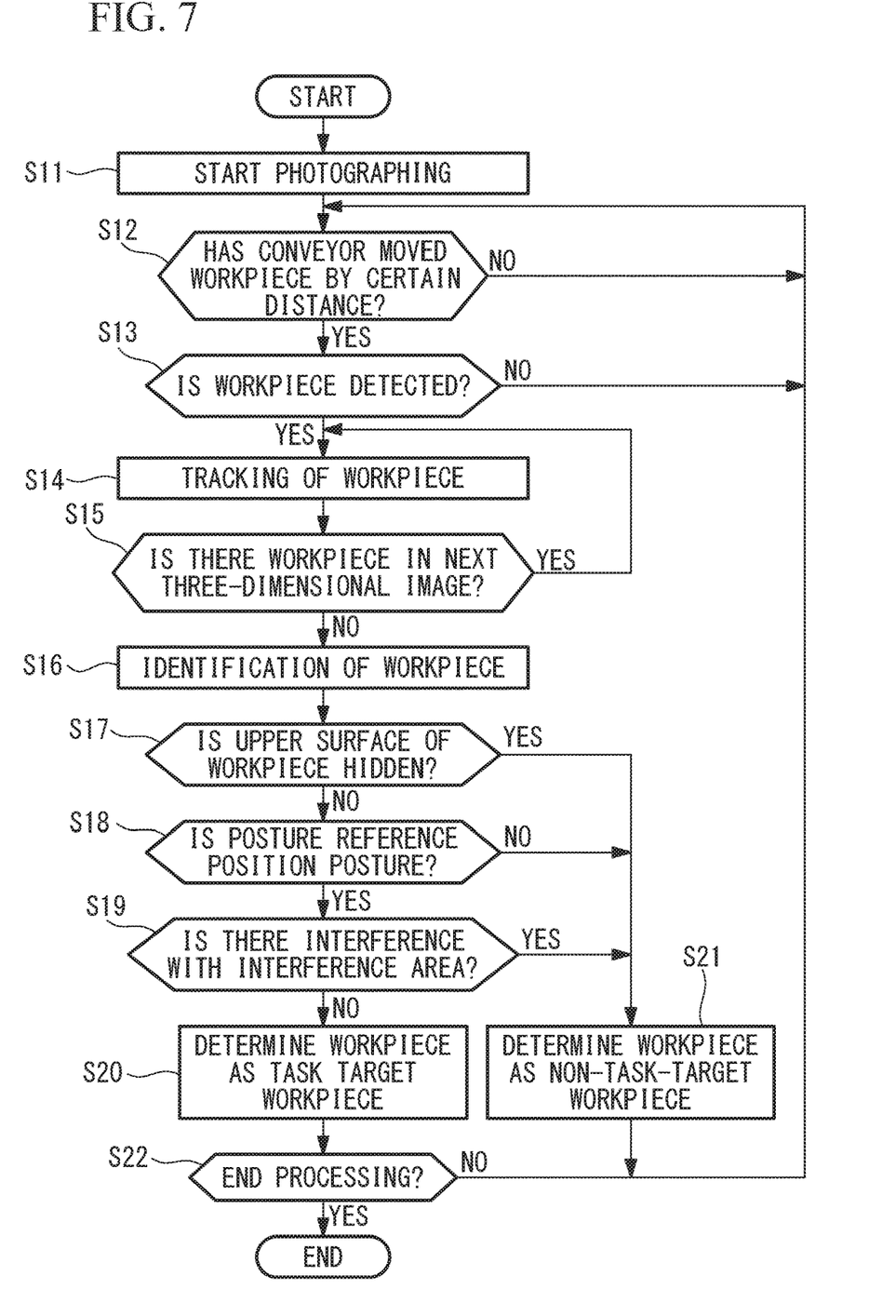
FIG. 7 is a flowchart of task target workpiece determination processing.

FIG. 7 is a flowchart of the task target workpiece determination processing for determining a task target workpiece that is a workpiece on which the robot 1 actually performs the task by performing the overlap judgement and the interference judgement on the workpiece. In the task target workpiece determination processing, first, a photographing step of starting the photographing of a predetermined range on the conveyor 11 by the three-dimensional camera 40 is performed (step S11). The three-dimensional camera 40 photographs a predetermined range in the conveyor 11 as a moving image.

The workpiece identification unit 62 judges whether the conveyor 11 has moved a workpiece by a certain distance set in advance (step S12). The workpiece identification unit 62 detects a moving distance of the workpiece on the conveyor 11 by the encoder 12. Note that the moving distance of the workpiece on the conveyor 11 may be calculated with use of the transfer speed of the conveyor 11 and the elapsed time. When it is judged that the conveyor 11 has not moved the workpiece by a certain distance (step S12: NO), the workpiece identification unit 62 continues to wait for the conveyor 11 to move the workpiece by a certain distance.

When it is judged that the conveyor 11 has moved the workpiece by a certain distance (step S12: YES), the workpiece identification unit 62 detects a workpiece from the three-dimensional image acquired by the three-dimensional camera 40 at the time point at which the conveyor 11 has moved the workpiece by a certain distance (step S13). When a workpiece is not detected from the three-dimensional image (step S13: NO), the processing of step S12 and steps thereafter is executed. When the workpiece is detected from the three-dimensional image (step S13: YES), the workpiece identification unit 62 tracks the detected workpiece (step S14).

Note that, in the article transfer apparatus 10 of this embodiment, a plurality of types of workpieces transferred by the conveyor 11 are workpieces that may become the task target workpieces and are the same workpieces as the reference workpieces stored in the storage unit 80.

Next, the workpiece identification unit 62 judges whether the workpiece that is being tracked can be detected in the next three-dimensional image acquired by the three-dimensional camera 40 after the conveyor 11 has moved the workpiece by a certain distance (step S15). In the processing, in other words, it is judged whether the workpiece that is being tracked has moved out of a photographing range of the three-dimensional camera 40 by being transferred by the conveyor 11. When the workpiece that is being tracked is in the three-dimensional image (step S15: YES), the workpiece identification unit 62 continues to track the workpiece (step S14).

In the processing of step S15, when the workpiece that is being tracked is no longer detected in the three-dimensional image acquired by the three-dimensional camera 40 (step S15: NO), the workpiece identification unit 62 identifies the three-dimensional shape and the posture of the workpiece that is being tracked with use of a plurality of three-dimensional images including the workpiece that is being tracked, and performs a workpiece distinguishing step of identifying which reference workpiece is the same workpiece as the workpiece or not (step S16). The workpiece identification unit 62 can identify the three-dimensional shape and the posture of the workpiece that is being tracked by associating the images of the workpiece in the plurality of three-dimensional images including the workpiece with each other.

Figure 8A:
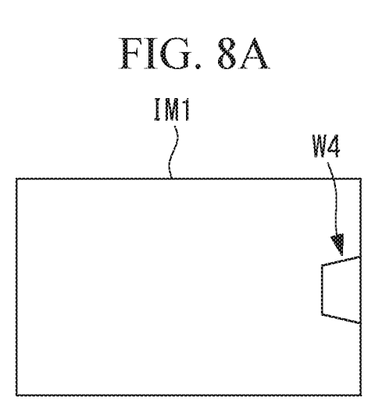
FIG. 8A is one of schematic views in which three-dimensional images of two workpieces transferred by the conveyor are arranged in chronological order from FIG. 8A to FIG. 8E.
Figure 8B:
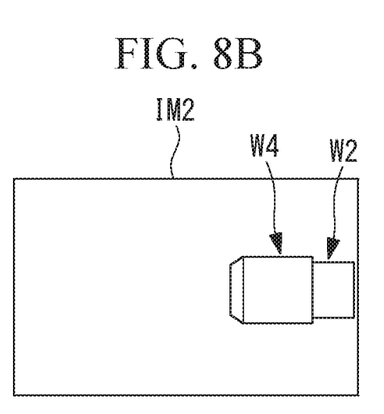
FIG. 8B is one of schematic views in which three-dimensional images of two workpieces transferred by the conveyor are arranged in chronological order from FIG. 8A to FIG. 8E.
Figure 8C:
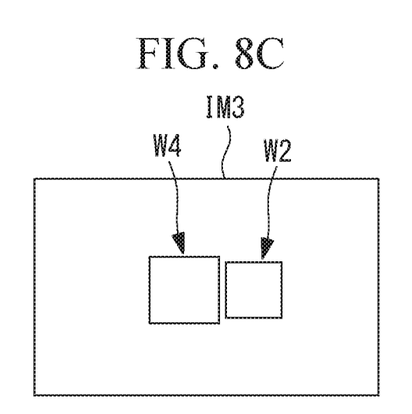
FIG. 8C is one of schematic views in which three-dimensional images of two workpieces transferred by the conveyor are arranged in chronological order from FIG. 8A to FIG. 8E.
Figure 8D:
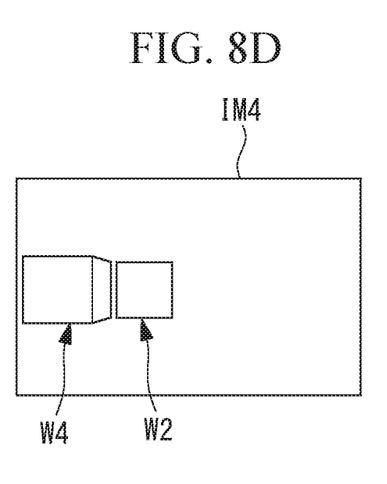
FIG. 8D is one of schematic views in which three-dimensional images of two workpieces transferred by the conveyor are arranged in chronological order from FIG. 8A to FIG. 8E.
Figure 8E:
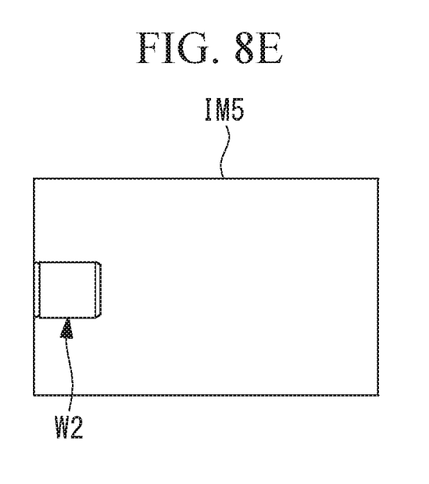
FIG. 8E is one of schematic views in which three-dimensional images of two workpieces transferred by the conveyor are arranged in chronological order from FIG. 8A to FIG. 8E.

FIGS. 8A to 8E illustrate five three-dimensional images IM1 to IM5 including two workpieces W2 and W4 transferred by the conveyor 11. Note that the moving direction of the conveyor in the three-dimensional images IM1 to IM5 in FIGS. 8A to 8E is a direction from the workpiece W2 toward the workpiece W4. In the three-dimensional image IM1 that is first acquired, only a side surface of the workpiece W4 on the traveling direction side is detected as illustrated in FIG. 8A. In the three-dimensional image IM2 that is secondly acquired and the three-dimensional image IM3 that is thirdly acquired, upper surfaces of the two workpieces W2 and W4 are detected as illustrated in FIG. 8B and FIG. 8C. In the three-dimensional image IM4 that is fourthly acquired, a side surface of the workpiece W4 on a side opposite to the traveling direction is newly detected as illustrated in FIG. 8D. In the three-dimensional image IM5 that is fifthly acquired, a side surface of the workpiece W2 on the side opposite to the traveling direction is newly detected as illustrated in FIG. 8E. As described above, in the example illustrated in FIG. 8A to FIG. 8E, when two types of workpieces W2 and W4 are transferred by the conveyor 11, the workpiece identification unit 62 identifies the three-dimensional shapes and the postures of the workpieces W2 and W4 with use of the three-dimensional images of the upper surfaces and the side surfaces in the workpieces W2 and W4 detected from five three-dimensional images.

Figure 9:
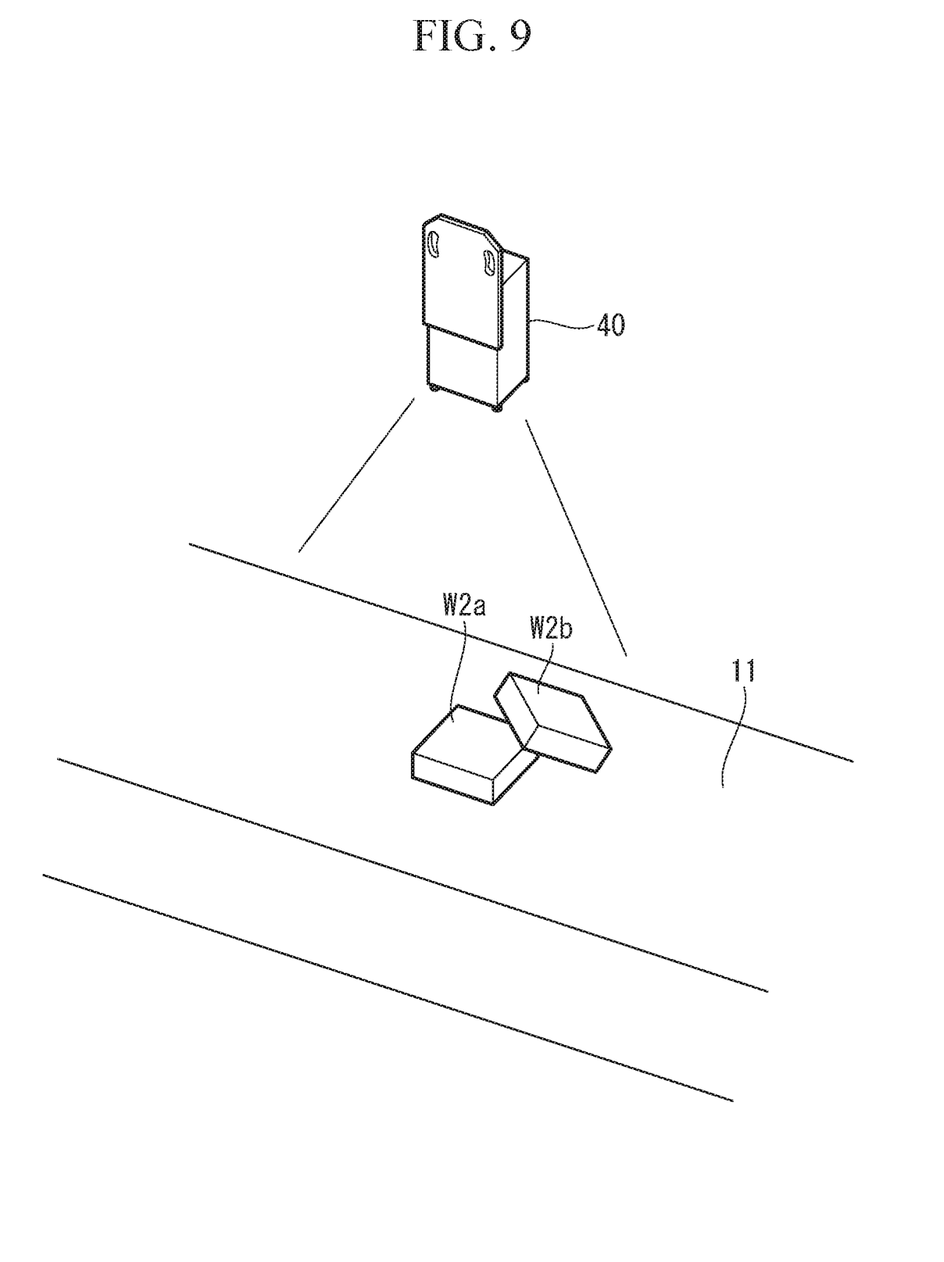
FIG. 9 is a perspective view illustrating a positional relationship between two workpieces overlapping with each other.

When the processing of step S16 illustrated in FIG. 7 is performed, the overlap judgement unit 63 judges the overlap between the workpiece (hereinafter also referred to as "shape-identified workpiece") of which three-dimensional shape and posture are identified and other workpieces by performing two processing of step S18 and step S19 with use of a three-dimensional image acquired by the three-dimensional camera 40. First, the overlap judgement unit 63 judges whether the upper surface of the shape-identified workpiece is hidden (step S17). As illustrated in FIG. 9, the two overlapping workpieces W2a and W2b are workpieces having the same three-dimensional shape. In this embodiment, the type of the workpieces transferred by the conveyor 11 is limited, and hence the workpiece identification unit 62 identifies the workpieces W2a and W2b as shape-identified workpieces without acquiring images of the entire surface of each of the upper surfaces and the side surfaces. In the example illustrated in FIG. 9, the workpiece W2b overlaps with a part of an upper surface of the workpiece W2a, and hence the upper surface cannot be photographed by the three-dimensional camera 40. Therefore, it is judged that the upper surface of the workpiece W2a is hidden.

In the processing of step S17, when it is judged that the upper surface of the shape-identified workpiece is hidden (step S17: YES), processing of step S21 described below is executed. When it is judged that the upper surface of the shape-identified workpiece is not hidden, that is, an image of the entire surface of the upper surface of the shape-identified workpiece is acquired (step S17: NO), the overlap judgement unit 63 then executes an overlap judgement step (step S18) of judging whether there is an overlap between the shape-identified workpiece and other workpieces by comparing the posture of the shape-identified workpiece and the reference position posture of the reference workpiece to each other. The overlap judgement unit 63 judges whether there is an overlap between the shape-identified workpiece and other workpieces by comparing the posture of the shape-identified workpiece with the two conditions, that is, the difference from the reference position posture of the reference workpiece having the same shape as the shape-identified workpiece in the height direction, and the rotation in the reference workpiece about the x-axis or the y-axis.

As illustrated in FIG. 9, when the posture of the workpiece W2b that is a shape-identified workpiece and the reference position posture of the reference workpiece having the same shape as the workpiece W2b are compared with each other, the center of gravity of the workpiece W2b is higher than the center of gravity of the workpiece W2b in a posture that does not overlap with the workpiece W2a, and at least one of the rotation angle about the x-axis and the rotation angle about the y-axis of the posture of the workpiece W2b is different. Therefore, the workpiece W2b is judged to overlap with the workpiece W2a that is the other workpiece.

In the processing of step S18 illustrated in FIG. 7, when it is judged that the posture of the shape-identified workpiece is different from the reference position posture (step S18: NO), the processing of step S21 described below is executed. Meanwhile, when it is judged that the posture of the shape-identified workpiece is the same as the reference position posture (step S18: YES), the interference judgement unit 64 judges whether other workpieces are interfering with the interference area set for the shape-identified workpiece (step S19). The interference area set for the shape-identified workpiece is an interference area that is set in advance for the reference workpiece having the same three-dimensional shape as the shape-identified workpiece.

When it is judged that other workpieces are not interfering with the interference area set for the shape-identified workpiece (step S19: NO), the shape-identified workpiece is determined as the task target workpiece on which the robot 1 performs the task (step S20). When it is judged that other workpieces are interfering with the interference area set for the shape-identified workpiece (step S19: YES), the shape-identified workpiece is determined as a non-task-target workpiece on which the robot 1 does not perform the task (step S21).

Figure 10:
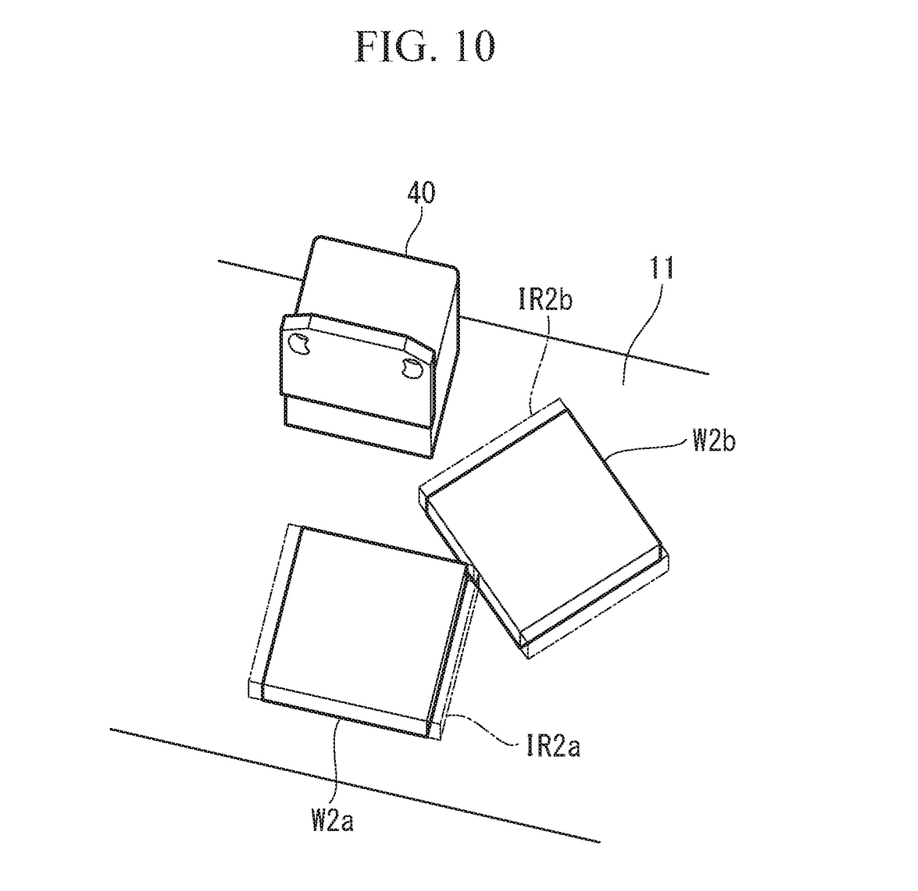
FIG. 10 is a perspective view illustrating a workpiece interfering with an interference areas set for a workpiece.

The two workpieces W2a and W2b illustrated in FIG. 10 are workpieces having the same three-dimensional shape, and interference areas IR2a and IR2b that are the same areas are set for the workpieces. As illustrated in FIG. 10, the workpiece W2b that is the other workpiece is interfering with the interference area IR2a set for the workpiece W2a, and hence the workpiece W2a is determined as a non-task-target workpiece. Meanwhile, other workpieces are not interfering with the interference area IR2b of the workpiece W2b, and hence the workpiece W2b is determined as a task target workpiece.

When the processing of step S20 and step S21 illustrated in FIG. 7 is executed, it is judged whether the task target workpiece determination processing is to be ended (step S22). For example, in accordance with the operation received by the operation unit 50, the processing of step S12 and steps thereafter is performed when the task target workpiece determination processing is to be continued (step S22: NO), and the task target workpiece determination processing ends when the processing is to be ended (step S22: YES).

In the article transfer apparatus 10 according to this embodiment configured as above, a three-dimensional image of the workpiece transferred by the conveyor 11 is acquired by the three-dimensional camera 40. The three-dimensional shape and the posture of the workpiece detected from the acquired three-dimensional image and the three-dimensional shape of the reference workpiece stored in the storage unit 80 are compared with each other, and it is judged whether the detected workpiece is a workpiece having the same three-dimensional shape as the reference workpiece. When the detected workpiece is a workpiece having the same three-dimensional shape as the reference workpiece, the overlap judgement is performed on the detected workpiece. When other workpieces are overlapping with the detected workpiece from the overlap judgement, the task by the robot 1 is not performed on the detected workpiece.

When the task by the robot 1 is performed on the detected workpiece while other workpieces are overlapping with the detected workpiece, the position and the posture of the other workpieces change. Therefore, by excluding workpieces that overlap with other workpieces from the task target of the robot 1, damage on the other workpieces and influences based on the change in the position and the posture of the other workpieces can be eliminated in advance, and the task can be performed on the workpiece with stability. In addition, in the article transfer apparatus 10 of this embodiment, the three-dimensional shapes and the postures of the workpieces are identified by acquiring the three-dimensional image of the workpieces transferred by the conveyor 11 by the three-dimensional camera. As a result, even when the color of the conveyor 11 and the color of the workpieces are the same color, the overlap between the workpieces can be accurately judged without a lighting and the like for changing the contrast when the workpieces are photographed.

In addition, in the article transfer apparatus 10 according to this embodiment, an interference area is set around the workpiece by the interference area setting unit 65, and it is judged whether other workpieces are interfering with the interference area of the workpiece transferred by the conveyor 11. When other workpieces are not interfering with the interference area set for the workpiece detected in the three-dimensional image, and there is no overlap between the detected workpiece and other workpieces, the task by the robot 1 is performed on the detected workpiece. Meanwhile, when other workpieces are interfering with the interference area of the detected workpiece, the task by the robot is not performed on the detected workpiece. Even when other workpieces are not directly interfering with the detected workpiece, in a task using a hand and the like by the robot 1, there is a fear that the hand and the like come into contact with the other workpieces. Therefore, when other workpieces are interfering with the interference area of the workpiece that is the task target of the robot 1, damage on the other workpieces and influences of the change in the position and the posture of the other workpieces can be eliminated in advance by excluding the workpiece from the task target.

Further, in this embodiment, even when other workpieces are not interfering with the interference area set for the detected workpiece, it is judged that there is interference with the detected workpiece when there are other workpieces above the interference area in the height direction. As a result, not only the part at which that the hand and the like actually grip the workpiece but also the area in which the hand and the like move in order to grip the workpiece is taken into consideration, and hence a fear that the hand and the like come into contact with other workpieces can be reduced more.

In the aforementioned embodiment, an example of the article transfer apparatus 10 and the robot system 100 including the article transfer apparatus 10 has been described, but various modifications can be made for the article transfer apparatus 10 and the robot system 100. For example, the article transfer apparatus 10 does not necessarily need to include the monitor 70 and the operation unit 50, and the robot 1 included in the robot system 100 may be a robot other than the vertical articulated type robot, for example, a robot such as a horizontal articulated type robot. The control unit 60 may be configured as an apparatus integrated with the conveyor 11. The moving amount and the transfer speed of the conveyor 11 are detected with use of the encoder 12, but may be detected with use of a three-dimensional image acquired by the three-dimensional camera 40 or an image acquired by other cameras, for example. In addition, the workpiece identification unit 62 does not necessarily need to perform the reference workpiece setting processing. Also, the workpiece identification unit 62 may perform the overlap judgement in the task target workpiece determination processing and does not necessarily need to perform the interference judgement.

In the aforementioned embodiment, the workpiece transferred by the conveyor 11 is the same workpiece as the reference workpiece stored in the storage unit 80 in advance and is a workpiece that may become the task target workpiece. However, the workpiece may be a workpiece that is not the task target of the robot 1 or may be a workpiece, which is different from the reference workpiece and has a three-dimensional shape and a posture that are not stored in the storage unit 80.

In the aforementioned embodiment, in the reference workpiece setting processing illustrated in FIG. 6, by performing the reference workpiece setting processing once for a workpiece, the three-dimensional shape and the reference position posture are set for the reference workpiece. However, the reference workpiece setting processing may be performed a plurality of times while changing the posture of the workpiece transferred by the conveyor 11. For example, for an intricately-shaped workpiece, a three-dimensional shape of the workpiece that is more accurate is set by performing the reference workpiece setting processing a plurality of times. In addition, when the reference workpiece setting processing is performed a plurality of times, one reference position posture may be selected from a plurality of acquired reference position postures by the user by operating the operation unit 50, for example.

In the aforementioned embodiment, as illustrated in FIGS. 8A to 8E, the three-dimensional shape and the posture of the workpiece transferred by the conveyor 11 are identified by acquiring a plurality of three-dimensional images of the workpiece taken from different viewpoints. In other modes, when the three-dimensional shapes of a plurality of types of workpieces transferred by the conveyor 11 greatly vary, it is also possible for the workpiece identification unit 62 to identify the three-dimensional shapes and the postures of the workpieces by acquiring one three-dimensional image, for example.

In the aforementioned embodiment, when the posture of the detected workpiece and the reference position posture are compared with each other, the height direction of the workpiece is judged by the center of gravity of the workpiece, but may be judged by other references such as a particular vertex and the center of gravity in a particular surface, for example.

In addition, in the interference judgement, other workpieces located above the interference area of the detected workpiece are also taken into consideration, but an area obtained by further adding an area to the interference area, or an area different from the area above the interference area may also be taken into consideration in the interference judgement depending on the position of the robot 1 with respect to the conveyor 11, the shape of the hand of the robot 1, and the like.

In addition, the control unit 60 acquires the transfer speed acquired of the conveyor 11 by the encoder 12 as the conveyor information, but the positional information of the conveyor 11, the positional information of the robot 1 with respect to the conveyor 11, and the positional information of the three-dimensional camera 40 with respect to the conveyor 11 may be acquired as the conveyor information.

As a result, the above-described embodiment leads to the following aspects.

An aspect of the present invention is directed to an article transfer apparatus including: a conveyor configured to transfer a workpiece; a photographing unit that acquires a three-dimensional image by photographing the workpiece transferred by the conveyor; a workpiece distinguishing unit that detects a three-dimensional shape and a posture of the workpiece on the basis of the three-dimensional image acquired by the photographing unit; a storage unit that stores therein a three-dimensional shape of a reference workpiece and a posture of the reference workpiece in a state in which the reference workpiece does not overlap with another workpiece; and an overlap judgement unit that judges whether there is an overlap with the workpiece on the basis of the three-dimensional shape and the posture of the reference workpiece stored in the storage unit, and the three-dimensional shape and the posture of the workpiece detected by the workpiece distinguishing unit.

According to this aspect, the three-dimensional image is acquired by photographing the workpiece transferred by the conveyor by the photographing unit. The three-dimensional shape and the posture of the workpiece included in the three-dimensional image acquired by the photographing unit are detected by the workpiece distinguishing unit. The three-dimensional shape of the workpiece detected by the workpiece distinguishing unit and the three-dimensional shape of the reference workpiece stored in the storage unit are compared with each other, and it is judged whether the detected workpiece is the reference workpiece stored in the storage unit in advance. When the detected workpiece is the reference workpiece stored in the storage unit, the posture of the detected workpiece and the posture of the reference workpiece stored in the storage unit are compared with each other. As a result, it is judged whether the detected workpiece overlaps with other workpieces on the conveyor. By judging the overlap between the workpieces, it can be chosen not to perform the task on workpieces that overlap with other workpieces, and the task can be performed only on workpieces that do not cause the positions and the postures of other workpieces to change. In addition, it is judged whether there is an overlap between the workpieces on the basis of the three-dimensional shapes and the postures of the workpieces. Therefore, even when the color of the conveyor and the color of the workpieces are the same color, it can be judged whether there is an overlap between the workpieces without a lighting and the like for changing the contrast at the time of photographing.

In the aforementioned aspect, there may be included a conveyor information acquisition unit that acquires a transfer speed of the conveyor, and the workpiece distinguishing unit may identify the three-dimensional shape and the posture of the same workpiece with use of the transfer speed acquired by the conveyor information acquisition unit and a plurality of three-dimensional images acquired by the photographing unit at different times.

The three-dimensional images of the same workpiece can be acquired from different viewpoints by photographing the workpiece by the photographing unit at different times while moving the workpiece in one direction by the conveyor. There are cases where a three-dimensional shape of the workpiece that is not included in a three-dimensional image acquired from one viewpoint is included in a three-dimensional image acquired from another viewpoint. Then, the acquired three-dimensional images can be associated with each other with use of the transfer speed of the conveyor acquired by the conveyor information acquisition unit. As a result, the three-dimensional shape and the posture of the workpiece can be identified more accurately.

In the aforementioned aspect, there may be included a reference workpiece setting unit that stores the three-dimensional shape and the posture of the workpiece identified by the workpiece distinguishing unit in the storage unit as a three-dimensional shape and a posture of a new reference workpiece when the workpiece is transferred by the conveyor without overlapping with another workpiece.

By the configuration as above, even a new workpiece that is not stored in the storage unit can be stored in the storage unit as the three-dimensional shape and the posture of a new reference workpiece when the new workpiece is transferred by the conveyor while not overlapping with other workpieces and when the three-dimensional shape and the posture thereof can be identified. As a result, the judgement of the overlap between the workpieces thereafter can be performed.

In the aforementioned aspect, there may be included an interference area setting unit that sets a predetermined interference area on an outer side of the three-dimensional shape of the workpiece detected by the workpiece distinguishing unit; and an interference judgement unit that judges whether there is interference between the interference area set by the interference area setting unit and another of the workpieces in the three-dimensional image acquired by the photographing unit.

By the configuration as above, a predetermined interference area is set on the outer side of the three-dimensional shape of the workpiece by the interference area setting unit when the three-dimensional shape of the workpiece is detected by the workpiece distinguishing unit. In the three-dimensional image acquired by the photographing unit, it is judged whether an interference is occurring between the interference area and other workpieces. When there are other workpieces interfering with the interference area, there is a possibility that a robot hand that handles the workpiece comes into contact with the other workpieces, for example, even if the workpieces do not overlap with each other. Therefore, by judging whether there is interference between the interference area around the workpiece and other workpieces, the positions and the postures of the other workpieces are prevented from being changed.

In the aforementioned aspect, the interference area setting unit may set different interference areas for the interference area in accordance with a type of the workpiece.

By the configuration as above, the task to be performed on the workpiece is prevented from being restricted more than necessary as compared to a case where a common interference area is set for all types of workpieces because there are cases where the area at which the robot hand grips the workpiece is different and cases where the shape of the robot hand itself is different, for example, depending on the shape of the workpiece.

In the aforementioned aspect, there may be included an input unit that receives an input, and the interference area setting unit may adjust at least one of a shape and a size of the interference area of the workpiece on the basis of the input received by the input unit.

By the configuration as above, the shape and the size of the interference area set for the workpiece can be changed by receiving the input by the input unit. For example, the interference area can be freely adjusted in accordance with the robot hand and the like used for the workpiece transferred by the conveyor.

In the aforementioned aspect, there may be included an image display unit that displays the three-dimensional image acquired by the photographing unit and the interference area set by the interference area setting unit.

By the configuration as above, the user that uses the article transfer apparatus can freely change the interference area while visually checking the three-dimensional shape and the interference area of the workpiece displayed on the image display unit.

Another aspect of the present invention is directed to a robot system including: the aforementioned article transfer apparatus; and a robot configured to perform a task on the workpiece that is judged by the overlap judgement unit to not have an overlap with another of the workpieces, and configured to not perform a task on the workpiece that is judged by the overlap judgement unit to have an overlap with another of the workpieces.

According to this aspect, out of the workpieces transferred by the conveyor of the article transfer apparatus, the robot performs the task only on workpieces that do not overlap with other workpieces, and hence a case where the robot comes into contact with the other overlapping workpieces and changes the position and the posture of the other workpieces can be prevented.

In addition, another aspect of the present invention is directed to an article transfer method, including: a photographing step of acquiring a three-dimensional image by photographing a workpiece transferred by a conveyor; a workpiece distinguishing step of detecting a three-dimensional shape and a posture of the workpiece on the basis of the acquired three-dimensional image; and an overlap judgement step of judging whether there is an overlap between the workpiece and another workpiece on the basis of the three-dimensional shape and the posture of the workpiece detected in the workpiece distinguishing step, and a three-dimensional shape and a posture of a reference workpieces that is stored.

According to the present invention, there is exhibited an effect in which the overlap between the plurality of workpieces transferred by the conveyor can be accurately judged, and the task can be performed on the plurality of transferred workpieces with stability.

REFERENCE SIGNS LIST 1 robot
10 article transfer apparatus
11 conveyor
12 encoder (conveyor information acquisition unit)
40 three-dimensional camera (photographing unit)
50 operation unit (input unit)
62 workpiece identification unit (workpiece distinguishing unit, reference workpiece setting unit)
63 overlap judgement unit (overlap judgement unit)
64 interference judgement unit (interference judgement unit)
65 interference area setting unit (interference area setting unit)
70 monitor (image display unit)
80 storage unit (storage unit)
100 robot system
IM1 to IM5 three-dimensional image
IR1$a$, IR2$a$, IR2$b$, IR3$a$, and IR4 interference area
W1, W2, W2$a$, W2$b$, W4, WK3$a$ to WK3$d$, and WK1$a$ to WK1$g$ workpiece
S11 photographing step
S16 workpiece distinguishing step
S18 overlap judgement step

The invention claimed is:
1. An article transfer apparatus, comprising:
a conveyor configured to transfer a workpiece;

a photographing unit that acquires a three-dimensional image by photographing the workpiece transferred by the conveyor;

a workpiece distinguishing unit that detects a three-dimensional shape and a posture of the workpiece on the basis of the three-dimensional image acquired by the photographing unit;

a storage unit that stores therein a three-dimensional shape of a reference workpiece and a posture of the reference workpiece in a state in which the reference workpiece does not overlap with another workpiece; and an overlap judgement unit that judges whether there is an overlap of the workpiece with a second workpiece on the basis of both a change in a height direction of the workpiece relative to the reference workpiece and a tilt of the workpiece relative to a transferring surface of the conveyor, wherein the tilt of the workpiece comprises a rotation of the workpiece about an x-axis parallel to a plane of the conveyer or a rotation of the workpiece about a y-axis parallel to the plane of the conveyer relative to the reference workpiece.

2. The article transfer apparatus according to claim 1, comprising a conveyor information acquisition unit that acquires a transfer speed of the conveyor, wherein the workpiece distinguishing unit identifies the three-dimensional shape and the posture of the workpiece by referencing the transfer speed acquired by the conveyor information acquisition unit and a plurality of three-dimensional images acquired by the photographing unit at different times.

3. The article transfer apparatus according to claim 2, comprising a reference workpiece setting unit that stores the three-dimensional shape and the posture of the workpiece identified by the workpiece distinguishing unit in the storage unit as a three-dimensional shape and a posture of a new reference workpiece when the workpiece is transferred by the conveyor without overlapping with the second workpiece.

4. The article transfer apparatus according to claim 1, comprising:
an interference area setting unit that sets a predetermined interference area on an outer side of the three-dimensional shape of the workpiece detected by the workpiece distinguishing unit; and
an interference judgement unit that judges whether there is interference between the interference area set by the interference area setting unit and another of the workpieces in the three-dimensional image acquired by the photographing unit.

5. The article transfer apparatus according to claim 4, wherein the interference area setting unit sets different interference areas for the interference area in accordance with a type of the workpiece.

6. The article transfer apparatus according to claim 4, comprising an input unit that receives an input, wherein the interference area setting unit adjusts at least one of a shape and a size of the interference area of the workpiece on the basis of an input received by the input unit.

7. The article transfer apparatus according to claim 4, comprising an image display unit that displays the three-dimensional image acquired by the photographing unit and the interference area set by the interference area setting unit.

8. A robot system, comprising:
the article transfer apparatus according to claim 1; and
a robot configured to perform a task on the workpiece that is judged by the overlap judgement unit to not have an overlap with another of the workpieces, and configured to not perform a task on the workpiece that is judged by the overlap judgement unit to have an overlap with the other of the workpieces.

9. The article transfer apparatus according to claim 1, wherein the change in the height direction of the workpiece is not based on the tilt of the workpiece relative to the transferring surface of the conveyor.

10. The article transfer method according to claim 9, wherein the change in the height direction of the workpiece is based on the workpiece being on top of another workpiece.

11. An article transfer method, comprising:
a photographing step of acquiring a three-dimensional image by photographing a workpiece transferred by a conveyor;
a workpiece distinguishing step of detecting a three-dimensional shape and a posture of the workpiece on the basis of the acquired three-dimensional image; and
an overlap judgement step of judging whether there is an overlap between the workpiece and a second workpiece on the basis of:
a change in a height direction of the workpiece relative to a stored-three dimensional shape of a reference workpiece; and
a tilt of the workpiece relative to a transferring surface of the conveyor, wherein the tilt of the workpiece comprises a rotation of the workpiece about an x-axis parallel to a plane of the conveyer or a rotation of the workpiece about a y-axis parallel to the plane of the conveyer relative to the stored-three dimensional shape of the reference workpiece.

12. The article transfer method according to claim 11, wherein the change in the height direction of the workpiece is not based on the tilt of the workpiece relative to the transferring surface of the conveyor.

13. The article transfer method according to claim 12, wherein the change in the height direction of the workpiece is based on the workpiece being on top of another workpiece.

* * * * *